United States Patent
Mok et al.

(10) Patent No.: US 6,820,159 B2
(45) Date of Patent: Nov. 16, 2004

(54) BUS INTERFACE FOR TRANSFER OF SONET/SDH DATA

(75) Inventors: Winston K. Mok, Vancouver (CA); Steven F. Lang, Vancouver (CA); Carl D. McCrosky, Saskatoon (CA); Richard T. Tse, Vancouver (CA)

(73) Assignee: PMC-Sierra, Ltd. (CA)

( * ) Notice: Subject to any disclaimer, the term of this patent is extended or adjusted under 35 U.S.C. 154(b) by 528 days.

(21) Appl. No.: 09/847,660

(22) Filed: May 3, 2001

(65) Prior Publication Data

US 2001/0056512 A1 Dec. 27, 2001

(30) Foreign Application Priority Data

May 5, 2000 (CA) ............................................. 2307895

(51) Int. Cl.[7] ............................................. G06F 13/00
(52) U.S. Cl. ........................ 710/305; 370/465; 370/389
(58) Field of Search ............................... 710/100, 305; 370/347, 358, 388, 389, 469, 465

(56) References Cited

U.S. PATENT DOCUMENTS

| 4,486,739 | A | | 12/1984 | Franaszek et al. | |
|---|---|---|---|---|---|
| 6,157,638 | A | * | 12/2000 | Tayloe et al. | 370/358 |
| 6,208,666 | B1 | * | 3/2001 | Lawrence et al. | 370/503 |
| 6,301,269 | B1 | * | 10/2001 | Tayloe et al. | 370/519 |
| 6,317,439 | B1 | * | 11/2001 | Cardona et al. | 370/503 |
| 6,359,859 | B1 | * | 3/2002 | Brolin et al. | 370/218 |
| 6,381,269 | B1 | * | 4/2002 | Gradl et al. | 375/224 |
| 6,430,201 | B1 | * | 8/2002 | Azizoglu et al. | 370/535 |
| 6,480,501 | B1 | * | 11/2002 | Blanc et al. | 370/422 |
| 6,498,792 | B1 | * | 12/2002 | Johnson et al. | 370/388 |
| 6,539,051 | B1 | * | 3/2003 | Grivna | 375/219 |
| 6,636,529 | B1 | * | 10/2003 | Goodman et al. | 370/469 |
| 6,654,565 | B2 | * | 11/2003 | Kenny | 398/182 |
| 6,671,271 | B1 | * | 12/2003 | Takemura et al. | 370/352 |
| 2001/0014104 | A1 | * | 8/2001 | Bottorf et al. | 370/471 |
| 2002/0001305 | A1 | * | 1/2002 | Hughes et al. | 370/369 |
| 2002/0114348 | A1 | * | 8/2002 | McCrosky et al. | 370/465 |

OTHER PUBLICATIONS

ANSI TI.105–1995 from American National Standards Institute Synchronous Optical Network (SONET)—Basic Description including Multiplex Structure, Rates and Formats.

ITU G.707 (03/96) from International Telecommunication Union Series G: Transmission Systems and Media Network node interface for the synchronous digital hierarchy (SDH).

A DC–Balanced, Partitioned–Block, 8B/10B Transmission Code from IBM Journal of Research & Development, Sep., 1983. Author A.X. Widmer and P.A. Franaszek.

IEEE P1396.i/D6.0a—COMBUS—A Backplane Bus & Package for Sonet Applications, draft from the Institute of Electrical and Electronic Engineers, Inc.

ISO/IEC 8802–3:2000(E), IEEE, Std. 802.3, 2000 edition, Part 3: Carrier sense multiple access with collision detection (CSMA/CD) access method and physical layer specifications.

* cited by examiner

Primary Examiner—Xuan M. Thai
(74) Attorney, Agent, or Firm—Hall, Myers, Vande Sande & Pequignot

(57) ABSTRACT

This invention provides a bus interface to connect SONET/SDH termination devices with payload processing devices while utilizing a minimum number of signals. The bus interface of this invention can scale with future advances in bandwidth in serial link technology.

20 Claims, 6 Drawing Sheets

| Code Group Name | Curr. RD- abcdei fghj | Curr. RD+ abcdei fghj | Decoded Signals Description |
|---|---|---|---|
| Multiplex Section Termination (MST) Mode ||||
| K28.5 | 001111 1010 | 110000 0101 | IJ0J1='b1, IPL = 'b0 Transport frame alignment |
| K.28.4- | 001111 0010 | - | IPAIS='b1' High-order path AIS |
| High-Order Path Termination (HPT) Mode ||||
| K28.0- | 001111 0100 | - | IPL = 'b0, High-order path H3 byte, no negative justification event |
| K28.0+ | - | 110000 1011 | IPL = 'b0 High-order path positive stuff opportunity byte, positive justification event |
| K28.6 | 001111 0110 | 110000 1001 | IJ1='b1', IPL = 'b1 High-order path frame alignment |

FIGURE 1A

| Code Group Name | Curr. RD- abcdei fghj | Curr. RD+ abcdei fghj | Decoded Signals Description |
|---|---|---|---|
| Low-Order Path Termination (LPT) Mode ||||
| K.28.4+ | - | 110000 1101 | ITAIS='b1'<br>Low-order path AIS<br>ID[7:0] = 'hFF |
| K27.7- | 110110 1000 | - | ITV5 = 'b1,, ITPL = 'b1<br>Low order path frame alignment<br>ID[0,4] = ERDI[1:0] = 'b00,<br>ID[5] = REI = 'b0 |
| K27.7+ | - | 001001 0111 | ITV5 = 'b1, ITPL = 'b1<br>Low order path frame alignment<br>ID[0,4] = ERDI[1:0] = 'b00,<br>ID[5] = REI = 'b1<br>ID[7,6,3:1] = 'b00000 |
| K28.7- | 001111 1000 | - | ITV5 = 'b1, ITPL = 'b1<br>Low order path frame alignment<br>ID[0,4] = ERDI[1:0] = 'b01,<br>ID[5] = REI = 'b0<br>ID[7,6,3:1] = 'b00000 |
| K28.7+ | - | 110000 0111 | ITV5 = 'b1, ITPL = 'b1<br>Low order path frame alignment<br>ID[0,4] = ERDI[1:0] = 'b01,<br>ID[5] = REI = 'b1<br>ID[7,6,3:1] = 'b00000 |
| K29.7- | 101110 1000 | - | ITV5 = 'b1, ITPL = 'b1<br>Low order path frame alignment<br>ID[0,4] = ERDI[1:0] = 'b10,<br>ID[5] = REI = 'b0<br>ID[7,6,3:1] = 'b00000 |
| K29.7+ | - | 010001 0111 | ITV5 = 'b1, ITPL = 'b1<br>Low order path frame alignment<br>ID[0,4] = ERDI[1:0] = 'b10,<br>ID[5] = REI = 'b1<br>ID[7,6,3:1] = 'b00000 |
| K30.7- | 011110 1000 | - | ITV5 = 'b1, ITPL = 'b1<br>Low order path frame alignment<br>ID[0,4] = ERDI[1:0] = 'b11,<br>ID[5] = REI = 'b0<br>ID[7,6,3:1] = 'b00000 |
| K30.7+ | - | 100001 0111 | ITV5 = 'b1, ITPL = 'b1<br>Low order path frame alignment<br>ID[0,4] = ERDI[1:0] = 'b11,<br>ID[5] = REI = 'b1<br>ID[7,6,3:1] = 'b00000 |
| K23.7- | 111010 1000 | 000101 0111 | ITPL = 0<br>Non low-order path payload overhead bytes (RSOH, MSOH, POH, R, V1, V2, V3, V4)<br>ID[7:0] = 'h00 |

FIGURE 1B

| Code Group Name | Curr. RD- abcdei fghj | Curr. RD+ abcdei fghj | Decoded Signals Description |
|---|---|---|---|
| Multiplex Section Termination (MST) Mode ||||
| K28.5 | 001111 0100 | 110000 1011 | OJ0='b1'<br>Transport frame alignment<br>OD[7:0] = 'h01 |
| K.28.4- | 001111 0010 | - | OPAIS='b1'<br>High-order path AIS<br>OD[7:0] = 'hFF |
| High-Order Path Termination (HPT) Mode ||||
| K28.0- | 001111 0100 | - | OPL = 'b0,<br>High-order path H3 byte,<br>no negative justification event<br>OD[7:0] = 'h00 |
| K28.0+ | - | 110000 1011 | OPL = 'b0<br>High-order path PSO byte, positive justification event<br>OD[7:0] = 'h00 |
| K28.6 | 001111 0110 | 110000 1001 | OJ1='b1'<br>High-order path frame alignment<br>OD[7:0] = 'h00 |

FIGURE 5A

| Code Group Name | Curr. RD- abcdei fghj | Curr. RD+ abcdei fghj | Decoded Signals Description |
|---|---|---|---|
| Low-Order Path Termination (LPT) Mode | | | |
| K27.7- | 110110 1000 | - | OTV5 = 'b1,, OTPL = 'b1<br>Low order path frame alignment<br>OD[0,4] = ERDI[1:0] = 'b00, OD[5] = REI = 'b0 |
| K27.7+ | - | 001001 0111 | OTV5 = 'b1, OTPL = 'b1<br>Low order path frame alignment<br>OD[0,4] = ERDI[1:0] = 'b00, OD[5] = REI = 'b1<br>OD[7,6,3:1] = 'b00000 |
| K28.7- | 001111 1000 | - | OTV5 = 'b1, OTPL = 'b1<br>Low order path frame alignment<br>OD[0,4] = ERDI[1:0] = 'b01, OD[5] = REI = 'b0<br>OD[7,6,3:1] = 'b00000 |
| K28.7+ | - | 110000 0111 | OTV5 = 'b1, OTPL = 'b1<br>Low order path frame alignment<br>OD[0,4] = ERDI[1:0] = 'b01, OD[5] = REI = 'b1<br>OD[7,6,3:1] = 'b00000 |
| K29.7- | 101110 1000 | - | OTV5 = 'b1, OTPL = 'b1<br>Low order path frame alignment<br>OD[0,4] = ERDI[1:0] = 'b10, OD[5] = REI = 'b0<br>OD[7,6,3:1] = 'b00000 |
| K29.7+ | - | 010001 0111 | OTV5 = 'b1, OTPL = 'b1<br>Low order path frame alignment<br>OD[0,4] = ERDI[1:0] = 'b10, OD[5] = REI = 'b1<br>OD[7,6,3:1] = 'b00000 |
| K30.7- | 011110 1000 | - | OTV5 = 'b1, OTPL = 'b1<br>Low order path frame alignment<br>OD[0,4] = ERDI[1:0] = 'b11, OD[5] = REI = 'b0<br>OD[7,6,3:1] = 'b00000 |
| K30.7+ | - | 100001 0111 | OTV5 = 'b1, OTPL = 'b1<br>Low order path frame alignment<br>OD[0,4] = ERDI[1:0] = 'b11, OD[5] = REI = 'b1<br>OD[7,6,3:1] = 'b00000 |
| K23.7- | 111010 1000 | - | OTPL = 0<br>Non low-order path payload bytes (RSOH, MSOH, POH, R, V1, V2, V3, V4)<br>OD[7:0] = 'h00 |
| K.28.4+ | - | 110000 1101 | OTAIS='b1'<br>Low-order path AIS<br>OD[7:0] = 'hFF |

FIGURE 5B

BUS INTERFACE FOR TRANSFER OF SONET/SDH DATA

FIELD

This invention relates generally to a bus interface used to transfer SONET/SDH data. More specifically, this invention relates to a bus interface for the transfer of SONET/SDH data over a serial backplane.

BACKGROUND OF THE INVENTION

In conventional data communication systems, a local node with a large number of SONET/SDH terminations, may process a large variety of payload types. Common payloads are Asynchronous Transfer Mode (ATM), Packet Over SONET (POS), and Time Division Multiplexing (TDM) traffic. In general, each of the payload types is processed by specialised hardware residing in disparate cards. For traffic not terminating in the local node, the traffic may be groomed and transported from input fibers to arbitrary output fibers.

The Combus standard provides a common interface between SONET termination devices and payload processing devices. However, the Combus standard is limited to OC-3 streams and contains 11 signals per interface. For a high capacity node, the number of signals required typically exceeds the limits of the Combus standard.

Another existing approach to connecting SONET/SDH termination devices to payload processing devices requires the reconstruction of a serial SONET/SDH stream post SONET/SDH termination. However, this method suffers from the disadvantage of requiring duplicate SONET/SDH processing at the payload processing devices. Another disadvantage of this method is the lack of guaranteed transitions on the serial links as SONET/SDH scrambling only provides a statistical amount of transitions. As a result, complex clock and data recovery phase-locked loops are often required.

To overcome the lack of guaranteed transitions on the serial links, an alternative approach is used that involves reconstructing a serial SONET/SDH stream post SONET/SDH termination and then applying a line code that guarantees transitions on the serial link. Again, this method suffers from the disadvantage of requiring duplicate SONET/SDH processing at the payload processors.

It is, therefore, an object of this invention to provide an improved bus interface to connect SONET/SDH termination devices with payload processing devices.

It is a further object of this invention to provide a bus interface to connect SONET/SDH termination devices with payload processing devices utilizing a minimum number of signals.

It is still a further object of this invention to provide a bus interface that can scale with future advances in bandwidth in serial link technology.

SUMMARY OF THE INVENTION

These and other objects of the invention are provided in a new and improved method of connecting SONET/SDH termination devices with payload processing devices while requiring a minimum number of signals. The protocol used in the method allows the SONET/SDH termination device to handoff at the SONET line termination level, path termination level, and tributary termination level (SDH multiplex section termination level, high-order path terminating level and low-order path terminating level). The protocol is also capable of scaling with future advances in bandwidth in serial link technology.

The method consists of providing a transmit interface and a receive interface. In operation, the transmit interface receives an incoming SONET/SDH signal stream and converts the SONET/SDH signal stream into outgoing low voltage differential signal (LVDS) levels. The SONET/SDH signal streams are mapped into 8B/10B control characters to label the SONET/SDH frame boundaries. Potential SONET/SDH frame boundaries include transport frame, high-order path frame and low-order path frame boundaries.

The receive interface receives incoming LVDS signal levels and converts the LVDS levels into outgoing SONET/SDH signal streams. The 8B/10B control characters labeling the SONET/SDH frame boundaries are decoded into SONET/SDH control signals.

By mapping a descrambled SONET/SDH data stream into 8B/10B control characters, proper data transitions on serial links can be ensured. Also, the mapping preserves the DC balance.

Preferably, the 8B/10B control characters that have an even number of ones and zeros have their positive and negative disparity codes treated as separate control characters. Line code violations of these 8B/10B characters may be used to monitor error performance of serial links.

Alternatively, the signals may be stored in a buffer. The signals can then be transferred using a universal frame pulse with a software programmable delay to allow the transfer of a single SONET/SDH signal over multiple links.

Preferably, the method also includes providing transparent in-band error reporting such that errors detected at a SONET/SDH receiver can be transferred to a transmitter to construct remote error and defect indication codes. The method may also include inserting a pseudo-random bit sequence pattern in serial transmit links to allow data path verification prior to injection of an actual payload.

Alternatively, the method may include overwriting one of the E1 and B1 bytes to form a pattern. This pattern allows in-service monitoring of link functionality as well as monitoring of downstream cross-connect mis-configurations. Optionally, the bytes in E1 may be overwritten with the complement of a value in B1 bytes.

The invention also includes a bus interface device operative to perform the steps of the method described above.

Other objects and advantages of the invention will become clear from the following detailed description of the preferred embodiment, which is presented by way of illustration only and without limiting the scope of the invention to the details thereof.

BRIEF DESCRIPTION OF THE DRAWINGS

Many objects and advantages of the present invention will be apparent to those of ordinary skill in the art when this specification is read in conjunction with the attached drawings wherein like reference numerals are applied to like elements and wherein:

FIG. 1A is a table containing 8B/10B control characters for a transmit interface;

FIG. 1B is a table containing 8B/10B control characters for a transmit interface;

FIG. 5A is a table containing 8B/10B control characters for a receive interface;

FIG. 5B is a table containing 8B/10B control characters for a receive interface;

DETAILED DESCRIPTION

Figure 1:
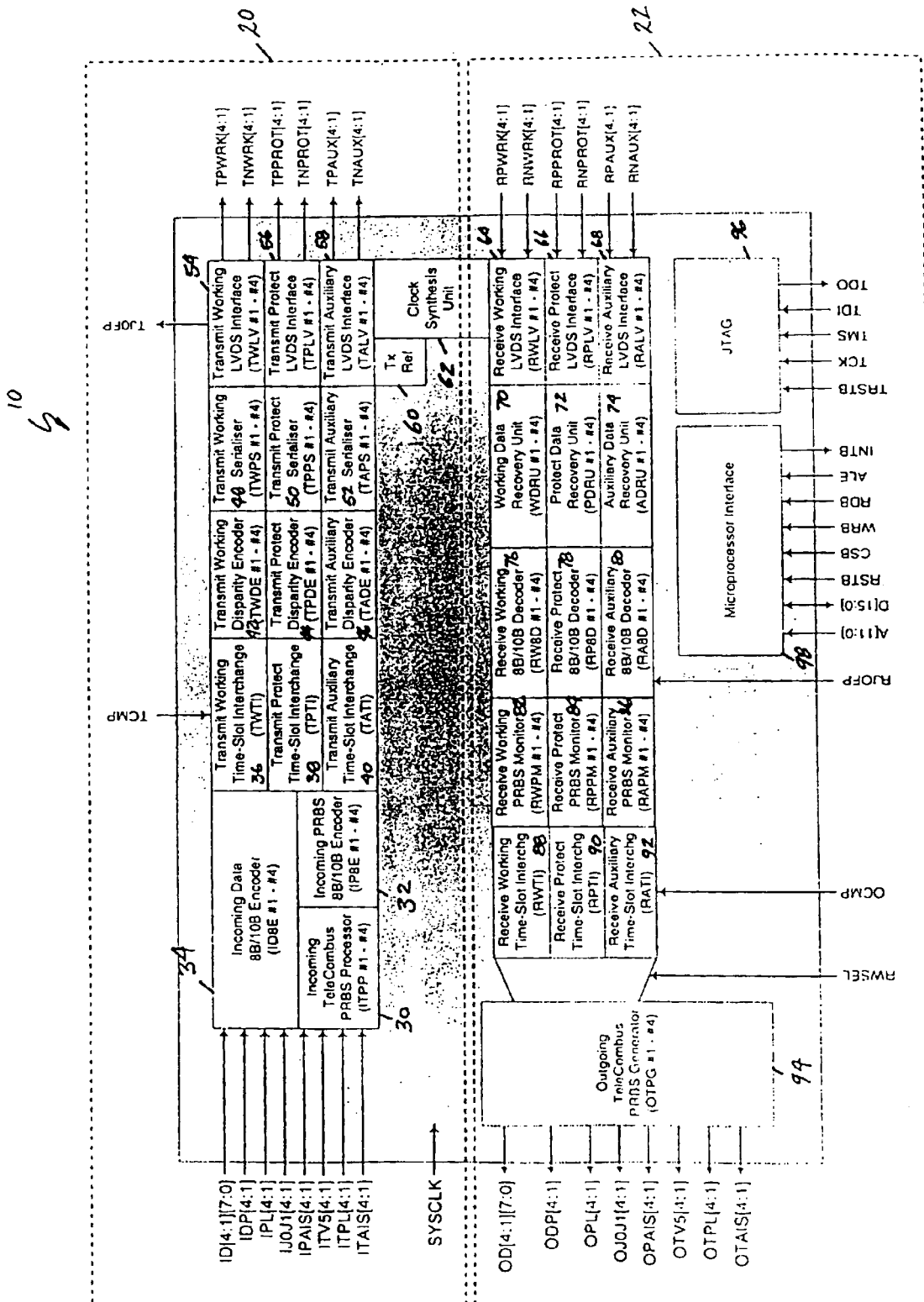
FIG. 1 is a schematic block diagram depicting an embodiment of the bus interface.

Referring to FIG. 1, the bus interface 10 is depicted having a transmit interface 20 and a receive interface 22.

The transmit interface 20 is comprised of an Incoming TeleCombus PRBS Processor (ITPP) block 30, an Incoming Data 8B/10B Encoder (ID8E) block 34, an Incoming PRBS 8B/10B Encoder (IP8E) block 32, Transmit Time-Slot Working, Protect and Auxiliary Interchange (TTSI) blocks 36, 38 and 40, respectively, Transmit Working, Protect and Auxiliary Disparity Encoder (TRDE) blocks 42, 44 and 46, respectively, Transmit Working, Protect and Auxiliary Serialiser (PISO) blocks 48, 50 and 52, respectively, and Transmit Working, Protect and Auxiliary LVDS Interface blocks 54, 56 and 58, respectively. The acronym PRBS refers to a pseudo-random bit sequence.

Incoming TeleCombus PRBS Processor

The Incoming TeleCombus PRBS Processor (ITPP) block 30 provides in-service and off-line diagnostics of the incoming TeleCombus stream and equipment downstream of the three sets of transmit LVDS links. Within the ITPP block 30, a total of four ITPP sub-blocks (ITPP #1–#4) are instantiated in the Telecom Bus Serialiser (TBS) device. Each ITPP sub-block has the capacity to monitor and source Pseudo Random Bit Sequence (PRBS) data of an STS-12/STM-4 stream. A set of four ITPP blocks may be connected in tandem to service an STS-48c/STM-16–16c stream.

The Incoming TeleCombus PRBS Processor (ITPP) block 30 includes a PRBS detector and a PRBS generator.

PRBS Detector

Each ITPP sub-block has an independent PRBS detector and generator. The PRBS detector in ITPP #1 to ITPP #4 monitors the four sections of the incoming data stream ID[1][7:0] to ID[4][7:0], respectively. When enabled, the PRBS detector monitors synchronous payload envelope (SPE)/higher order virtual container (VC3 or VC4-Xc) bytes in the incoming data stream. The incoming data is compared against the expected value derived from an internal linear feedback shift register (LFSR) with a polynomial of $X^{23}+X^{18}+1$. If the incoming data fails to match the expected value for three consecutive bytes, the PRBS detector will enter out-of-synchronization (OOS) state. The LFSR will be re-initialized using the incoming data bytes. The new LFSR seed is confirmed by comparison with subsequent incoming data bytes. The PRBS detector will exit the OOS state when the incoming data matches the LFSR output for three consecutive bytes. The PRBS detector will remain in the OOS state and re-load the LFSR if confirmation failed. The PRBS detector counts PRBS byte errors and optionally generates interrupts when it enters and exits the OOS state.

The PRBS detector may be configured to also monitor the B1 and E1 bytes in the incoming date stream. The B1 byte in each incoming STS-1/STM-0 is compared with an independently software programmable value. The E1 byte is compared with the complement of the programmable value. An interrupt is optionally generated when there is a change from the matched to mismatched state and vice-versa. The incoming B1 bytes are captured in a set of software readable registers. This facility allows in-service diagnosis of provisioning errors in upstream cross-connect devices.

PRBS Generator

The PRBS generator in ITPP #1 to ITPP #4 may optionally overwrite the data in incoming data stream ID[1][7:0] to ID[4][7:0], respectively. When enabled, the PRBS generator inserts synchronous payload envelope (SPE)/higher order virtual container (VC3 or VC4-Xc) bytes into the serial transmit links. The inserted data is derived from an internal linear feedback shift register (LFSR) with a polynomial of $X^{23}+X^{18}+1$.

The PRBS generator may be configured to optionally insert a software programmable byte into the B1 byte of each STS-1/STM-0 stream the serial transmit links. The E1 bytes may be over-written to the complement of the value inserted into the B1 bytes. This facility allows in-service diagnosis of provisioning errors in downstream cross-connect devices.

Incoming Data 8B/10B Encoder

The Incoming Data 8B/10B Encoder (ID8E) block 34 constructs an 8B/10B character stream from an incoming TeleCombus carrying an STS-12/STM-4 stream. Within the ID8E block 34, a total of four ID8E sub-blocks (ID8E #1 to #4) are instantiated in the TBS device. ID8E sub-blocks #1 to #4 process incoming data streams ID[1][7:0] to ID[4][7:0], respectively.

Frame Counter

Figure 2:
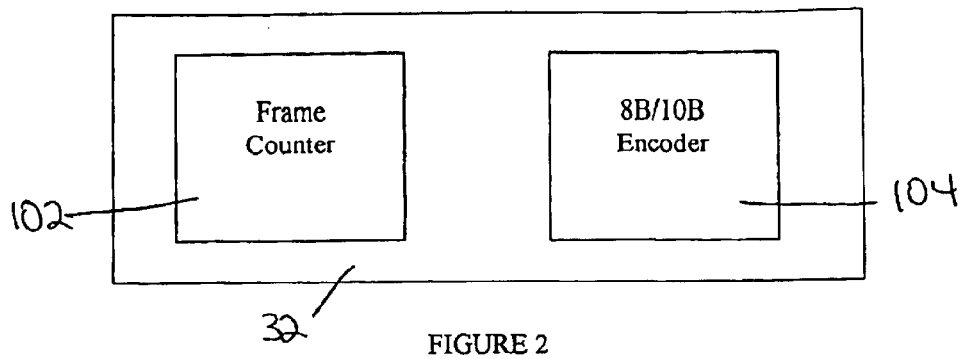
FIG. 2 is a block diagram depicting an embodiment of an incoming data 8B/10B encoder block.
Figure 3:
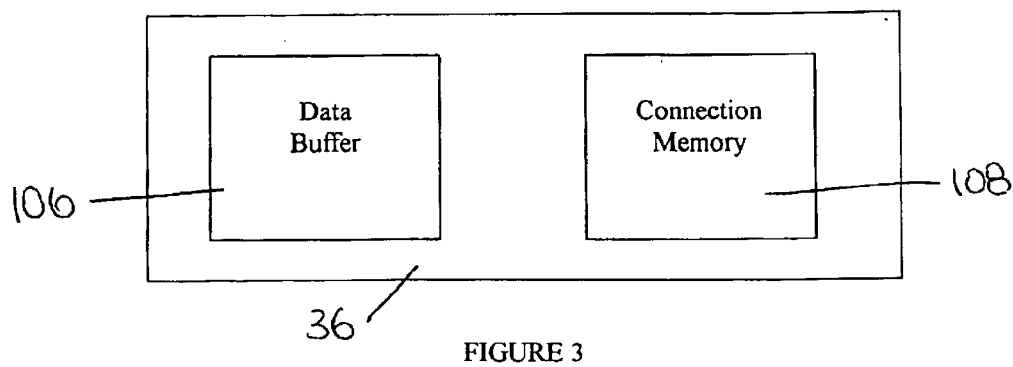
FIG. 3 is a block diagram depicting an embodiment of a transmit time-slot interchange block.

Each of the ID8E sub-blocks #1 to #4 of ID8E block 34 includes a Frame Counter 102 and an 8B/10B Encoder 104 as shown in FIG. 2.

The Frame Counter 102 keeps track of the octet identity of the incoming data stream. The Frame Counter 102 is initialized by the J0 pulse on the IJ0J1 and IPL signals. It identifies the positive stuff opportunity (PSO) and negative stuff opportunity (H3) bytes within the transport frame so that high-order path pointer justification events can be identified and encoded.

8B/10B Encoder

The 8B/10B Encoder 104 converts bytes in the incoming STS-12/STM-4 stream to 8B/10B characters. It can operate in one of three modes; multiplex section termination (MST), high-order path termination (HPT) and low-order path termination (LPT) modes. The modes relate to the level of SONET/SDH processing capability in the external device driving the incoming TeleCombus (ID[4:1][7:0]).

In MST mode, the upstream device is a multiplex section terminator. It has identified transport frame boundaries. The first J0 byte (J0) is encoded by an 8B/10B control character. Incoming TeleCombus signals ITV5[4:1], ITPL[4:1], and ITAIS[4:1] and the J1 portion of IJ0J1[4:1] are ignored.

In HPT mode, the upstream device is a high-order path terminator and has performed pointer processing to identify STS/AU level pointer justification events. It has processed all the STS/VC3/VC4 path overhead bytes. The H3 bytes in the absence of negative pointer justification events, the PSO byte in the presence of positive pointer justification events may be encoded. Alternately, the J1 byte may be encoded. Incoming TeleCombus signals ITV5[4:1], ITPL[4:1], and ITAIS[4:1] are ignored.

In LPT mode, the upstream device is a low-order path terminator. It has performed tributary level pointer processing to identify tributary payload bytes and have terminated tributary payload/low-order virtual container bytes. In addition to MST and HPT mode bytes, V5 bytes and all bytes that are not part of a low-order path payload are encoded. Note that in drop-and-continue operation, the TBS must be configured to regard the upstream device as one appropriate for the continued path.

FIGS. 1A and 1B show the mapping of TeleCombus control bytes and signals into 8B/10B control characters. FIG. 1A shows the character mapping for the MST and HPT modes of operation. FIG. 1B shows the character mapping for the LPT mode of operation.

Incoming PRBS 8B/10B Encoder

The Incoming PRBS 8B/10B Encoder (IP8E) block 32 constructs an 8B/10B character stream from the output of the ITPP block 30. Within the IP8E block 32, a total of four IP8E sub-blocks (IP8E #1 to #4) are instantiated in the TBS device. IP8E sub-blocks #1 to #4 process data from ITPP sub-blocks #1 to #4, respectively. The IP8E block 32 may be functionally identical to the ID8E block 34.

Transmit Time-slot Interchange

The Transmit Time-slot Interchange (TTSI) blocks 36, 38 and 40 re-arrange the constituent STS-1/STM-0 streams of an STS-48/STM-16 stream in a software configurable order. The TTSI blocks 36, 38 and 40 also support multi-casting where an incoming STS-1/STM-0 stream is placed on two or more outgoing time-slots. The Transmit Working Time-slot Interchange (TWTI) block 36 performs time-slot re-arrangement for data destined for the working transmit LVDS links (TPWRK[4:1]/TNWRK[4:1]). The Transmit Protection Time-slot Interchange (TPTI) block 38 services the protection transmit LVDS links (TPPROT[4:1]/TNPROT[4:1]) while the Transmit Auxiliary Time-slot Interchange (TATI) block 40 services the auxiliary transmit LVDS links (TPAUX[4:1]/TNAUX[4:1]).

Each of the TTSI blocks 36, 38 and 40 includes a Data Buffer 106 and Connection Memory 108.

Data Buffer

The Data Buffer 106 contains a double buffer structure. The incoming data stream is first loaded into an input shift register. A frame counter initiates a transfer of the data to the holding register once all 48 constituent STS-1/STM-0 streams have been shifted in. The data is read out of the holding register in the order specified by the Connection Memory 108.

Connection Memory

The Connection Memory 108 contains two mapping pages: page 0 and page 1. One page is designated the active page and the other the stand-by page. Selection between which page is to be active and which is to be stand-by is controlled by the TCMP signal. The Connection Memory 108 samples the value on the TCMP signal at the J0 byte position of the incoming data stream and swaps the active/standby status of the two pages at the first A1 byte of the next frame. This arrangement allows all devices in a cross-connect system to be updated in a coordinated fashion. Consequently, STS-1/STM-0 streams not being assigned new time-slots are unaffected by page swaps.

Transmit 8B/10B Running Disparity Encoder

The Transmit 8B/10B Running Disparity Encoder (TRDE) blocks 42, 44 and 46 correct the running disparity of an 8B/10B character stream. The input data to the TRDE blocks 42, 44 and 46 originates from either the ID8E sub-blocks #1 to #4 or the IP8E sub-blocks #1 to #4 at which point they have correct running disparity. However, due to the time-slot re-arrangement activities of the TTSI blocks 36, 38 and 40, the running disparity is no longer consistent. The TRDE block inverts the 6B and 4B sub-characters to ensure correct running disparity.

There are a total of twelve TRDE sub-blocks instantiated in the TBS device. Four TRDE sub-blocks (TWDE #1 to #4), within Transmit Working Disparity Encoder 42 are dedicated to the working transmit LVDS links (TPWRK[4:1]/TNWRK[4:1]). The Transmit Protection Disparity Encoder 44 (TPDE #1 to #4) corrects running disparity for characters destined for the protection transmit LVDS links (TPPROT[4:1]/TNPROT[4:1]) while the Transmit Auxiliary Disparity Encoder 46 (TADE #1 to #4) services the auxiliary transmit LVDS links (TPAUX[4:1]/TNAUX[4:1]).

Transmit Serialiser

The Transmit Serialiser (PISO) blocks 48, 50 and 52 convert 8B/10B characters to bit-serial format. There are a total of twelve PISO sub-blocks instantiated in the TBS device. Four PISO sub-blocks, Transmit Working Serialiser 48 (TWPS #1 to #4) are dedicated to the working transmit LVDS links (TPWRK[4:1]/TNWRK[4:1]). The Transmit Protection Serialiser 50 (TPPS #1 to #4) generates serial streams for the protection transmit LVDS links (TPPROT[4:1]/TNPROT[4:1]) while the Transmit Auxiliary Serialiser 52 (TAPS #1 to #4) are associated with the auxiliary transmit LVDS links (TPAUX[4:1]/TNAUX[4:1]).

LVDS Transmitter

The LVDS Transmitters, TWLV block 54, TPLV block 56 and TALV block 58 (referred to as TXLV blocks) convert 8B/10B encoded digital bit-serial streams to LVDS signaling levels. A total of twelve TXLV sub-blocks are instantiated in the TBS device. Four TXLV sub-blocks, Transmit Working LVDS Interface 54 (TWLV #1 to #4) drives the working transmit LVDS links (TPWRK[4:1]/TNWRK[4:1]). The Transmit Protection LVDS Interface 56 (TPLV #1 to #4) drives the protection transmit LVDS links (TPPROT[4:1]/TNPROT[4:1]) while the Transmit Auxiliary LVDS Interface 58 (TALV #1 to #4) are associated with the auxiliary transmit LVDS links (TPAUX[4:1]/TNAUX[4:1]).

Clock Synthesis Unit

The Clock Synthesis Unit (CSU) block 62 generates the 777.6 MHz clock for the transmit and receive LVDS links.

Transmit Reference Generator

The Transmit Voltage Reference Generator block 60 generates bias voltages and currents for the LVDS Transmitters.

Receive Interface

The receive interface 22 is comprised of Receive LVDS Interface blocks 64, 66, and 68, Data Recovery Units 70, 72 and 74, Receive 8B/10B Decoders 76, 78 and 80, Receive PRBS Monitors 82, 84 and 86, Receive Time-Slot Interchanges 88, 90 and 92, and an Outgoing TeleCombus PRBS Generator 94.

LVDS Receivers

The LVDS Receivers, RWLV block 64, RPLV block 66 and RALV block 68 (referred to as RXLV blocks) convert LVDS signaling levels to 8B/10B encoded digital bit-serial. A total of twelve RXLV sub-blocks are instantiated in the TBS device. Four RXLV sub-blocks, Receive Working LVDS Interface 64 (RWLV #1 to #4) connect to the working receive LVDS links (RPWRK[4:1]/RNWRK[4:11]). The Receive Protection LVDS Interface 66 (RPLV #1 to #4) connects to the protection receive LVDS links (RPPROT[4:1]/RNPROT[4:1]) while the Receive Auxiliary LVDS Interface 68 (RALV #1 to #4) are associated with the auxiliary receive LVDS links (RPAUX[4:1]/RNAUX[4:1]).

Data Recovery Units

The Data Recovery Unit (DRU) blocks 70, 72 and 74 monitor the receive LVDS link for transitions to determine the extent of bit cycles on the link. They then adjust its internal timing to sample the link in the middle of the data "eye". A total of twelve DRU sub-blocks are instantiated in the TBS device. Four DRU sub-blocks, Working Data Recovery Units 70 (WDRU #1 to #4) retrieves data from the working receive LVDS links (RPWRK[4:1]/RNWRK[4:1]). The Protection Data Recovery Units 72 (PDRU #1 to #4) process the protection receive LVDS links (RPPROT[4:1]/

RNPROT[4:1]) while the Auxiliary Data Recovery Units 74 (RALV #1 to #4) are associated with the auxiliary receive LVDS links (RPAUX[4:1]/RNAUX[4:1]).

The DRU blocks also convert the bit serial stream into 10-bit words. The words are constructed from ten consecutive received bits without regard to 8B/10B character boundaries.

Receive 8B/10B TeleCombus Decoder

The Receive 8B/10B TeleCombus Decoder (R8TD) blocks 76, 78 and 80 frame to the receive stream to find 8B/10B character boundaries. They also contain a FIFO to bridge between the timing domain of the receive LVDS links and the system clock timing domain. A total of twelve R8TD sub-blocks are instantiated in the TBS device. Four R8TD sub-blocks, Receiver Working 8B/10B Decoder blocks 76 (RW8D #1 to #4) perform framing and elastic store functions on data retrieved from the working receive LVDS links (RPWRK[4:1]/RNWRK[4:1]). The Receive 8B/10B Decoder blocks 78 (RP8D #1 to #4) process data on the protection receive LVDS links (RPPROT[4:1]/RNPROT [4:1]) while the Receive Auxiliary 8B/10B Decoder blocks 80 (RA8D #1 to #4) are associated with the auxiliary receive LVDS links (RPAUX[4:1]/RNAUX[4:1]).

Figure 4:
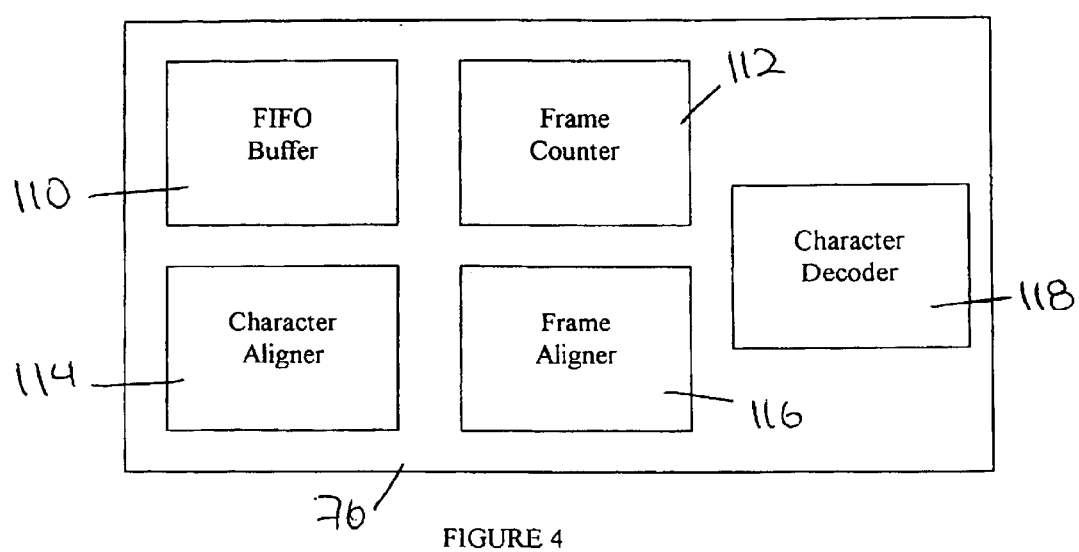
FIG. 4 is a block diagram depicting an embodiment of a receive 8B/10B TeleCombus decoder block.

Each of the R8TD sub-blocks includes a FIFO buffer 110, a Frame Counter 112, a Character Aligner 114, a Frame Aligner 116 and a Character Decoder 118 shown in FIG. 4.

FIFO Buffer

The FIFO buffer 110 provides isolation between the timing domain of the associated receive LVDS link and that of the system clock (SYSCLK). Data with arbitrary alignment to 8B/10B characters are written into a 10-bit by 24-word deep FIFO buffer 110 at the link clock rate. Data is read from the FIFO buffer 110 at every SYSCLK cycle.

Frame Counter

The Frame Counter 112 keeps track of the octet identity of the outgoing data stream. It is initialized by a delayed version of the RJ0FP signal. It identifies the positive stuff opportunity (PSO) and negative stuff opportunity (H3) bytes within the transport frame so that high-order path pointer justification events can be identified and decoded.

Character Aligner

The Character Aligner 114 locates character boundaries in the incoming 8B/10B data stream. The framer logic may be in one of two states, SYNC state and HUNT state. It uses the 8B/10B control character (K28.5) used to encode the SONET/SDH J0 byte to locate character boundaries and to enter the SYNC state. It monitors the receive data stream for line code violations (LCV). An LCV is declared when the running disparity of the receive data is not consistent with the previous character or the data is not one of the characters defined in IEEE std. 802.3. Excessive LCVs are used to transition the framer logic to the HUNT state.

Normal operation occurs when the character aligner 114 is in the SYNC state. 8B/10B characters are extracted from the FIFO buffer 110 using the character alignment of the K28.5 character that caused entry to the SYNC state. Mimic K28.5 characters at other alignments are ignored. The receive data is constantly monitored for line code violations. If 5 or more LCVs are detected in a window of 15 characters, the character aligner transitions to the HUNT state. It will search all possible alignments in the receive data for the K28.5 character. In the mean time, the original character alignment is maintained until a K28.5 character is found. At that point, the character alignment is moved to this new location and the character aligner transitions to the SYNC state.

Frame Aligner

The frame aligner 116 monitors the data read from the FIFO buffer 110 for the J0 byte. When the frame counter 112 indicates the J0 byte position, a J0 character is expected to be read from the FIFO buffer 110. If a J0 byte is read out of the FIFO buffer 110 at other byte positions, a J0 byte error counter is incremented. When the counter reaches a count of 3, the frame aligner 116 transitions to HUNT state. The next time a J0 character is read from the FIFO buffer 110, the associated read address is latched and the frame aligner 116 transitions back to the SYNC state. The J0 byte error counter is cleared when a J0 byte is read from the FIFO buffer 110 at the expected position.

Character Decoder

The character decoder 118 decodes the incoming 8B/10B control characters into an extended set of TeleCombus control signals. FIGS. 5A and 5B show the mapping of 8B/10B control characters into TeleCombus control signals. FIG. 5A shows the character mapping for the MST and HPT modes of operation and FIG. 5B shows the character mapping for the LPT mode of operation in the 8B/10B encoder in an external device upstream of the TBS. The character decoder itself is not mode sensitive.

Receive PRBS Monitor

The Receive PRBS Monitor (RPRM) blocks 82, 84 and 86 provide in-service and off-line diagnostics of the receive LVDS links. A total of twelve RPRM sub-blocks are instantiated in the TBS device. Four RPRM sub-blocks, Receive Working PRBS Monitor 82 (RWPM #1 to #4) connect to the working receive LVDS links (RPWRK[4:1]/RNWRK[4:1]). The Receive Protection PRBS Monitor 84 (RPPM #1 to #4) connect to the protection receive LVDS links (RPPROT [4:1]/RNPROT[4:1]) while the Receive Auxiliary PRBS Monitor 86 (RAPM #1 to #4) are associated with the auxiliary receive LVDS links (RPAUX[4:1]/RNAUX[4:1]). The RPRM blocks 82, 84 and 86 are functionally identical to the monitor section of the ITPP block 30.

Receive Time-slot Interchange

The Receive Time-slot Interchange (RTSI) blocks 88, 90 and 92 re-arrange the constituent STS-1/STM-0 streams of an STS-48/STM-16 stream in a software configurable order. The RTSI blocks 88, 90 and 92 also support multi-casting where a STS-1/STM-0 stream from one of the three receive LVDS links is placed on two or more outgoing time-slots. The Receive Working Time-slot Interchange (RWTI) block 88 performs time-slot re-arrangement for data sourced from the working receive LVDS links (RPWRK[4:1]/RNWRK [4:1]). The Received Protection Time-slot Interchange (RPTI) block 90 services the protection receive LVDS links (RPPROT[4:1]/RNPROT[4:1]) while the Receive Auxiliary Time-slot Interchange (RATI) block 92 services the auxiliary receive LVDS links (RPAUX[4:1]/RNAUX[4:1]).

Outgoing TeleCombus PRBS Generator

The Outgoing TeleCombus PRBS Generator (OTPG) block 94 optionally inserts a PRBS pattern on a per STS-1/STM-0 onto the Outgoing TeleCombus stream. A total of four OTPG sub-blocks (OTPG #1 to #4) are instantiated in the TBS device. Each OTPG sub-block has the capacity to source PRBS data of an STS-12/STM-4 stream. A set of four OTPG sub-blocks may be connected in tandem to service an STS-48c/STM-16–16c stream. The OTPG block 94 is functionally identical to the generator section of the ITPP block 30.

LVDS Overview

The LVDS family of cells allow the implementation of 777.6 Mb/s LVDS links. A reference clock of 77.76 MHz is required. Four 777.6 Mb/s LVDS form a set of high-speed serial data links for passing an STS-48 aggregate data stream.

The transmitter drives a differential signal through a pair of 50Ω characteristic interconnects, such as board traces, backplane traces, or short lengths of cable. The at receiver presents a 100Ω differential termination impedance to terminate the lines. Included in the standard is sufficient common-mode range for the receiver to accommodate as much as 925 mV of common-mode ground difference.

Complete SERDES transceiver functionality is provided. Ten-bit parallel data is sampled by the line rate divided-by-10 clock (77.76 MHz SYSCLK) and then serialized at the line rate on the LVDS output pins by a 777.6 MHz clock synthesized from SYSCLK. Serial line rate LVDS data is sampled and deserialized to 10-bit parallel data. Parallel output transfers are synchronized to a gated line rate divided-by-10 clock. The 10-bit data is passed to an 8B/10B decoding block. The gating duty cycle is adjusted such that the throughput of the parallel interface equals the receive input data rate (Line Rate+/−100 ppm). It is expected that the clock source of the transmitter and the receiver the same to ensure that the data throughput at both ends of the link are identical.

Data must contain sufficient transition density to allow reliable operation of the data recovery units. 8B/10B block coding and decoding is provided by the T8TE and R8TD blocks.

At the system level, reliable operation will be obtained if proper signal integrity is maintained through the signal path and the receiver requirements are respected. Namely, a worst case eye opening of 0.7 UI and 100 mV differential amplitude is needed. These conditions should be achievable with a system architecture consisting of board traces, two sets of backplane connectors and up to 1 m of backplane interconnects. This assumes proper design of 100Ω differential lines and minimization of discontinuities in the signal path. Due to power constraints, the output differential amplitude is approximately 350 mV.

The LVDS system is comprised of the LVDS Receivers (RXLV) 64, 66 and 68, LVDS Transmitter (TXLV) 54, 56 and 58, Transmitter reference (TXREF) 60, data recovery units (DRU) 70, 72 and 74, parallel to serial converters (PISO) 48, 50 and 52 and Clock Synthesis Unit (CSU) 62.

Microprocessor Interface

The Microprocessor Interface block 98 provides normal and test mode registers, and logic required to connect to the microprocessor interface. The normal mode registers are required for normal operation, and test mode registers are used to enhance testability of the TBS.

Frame Alignment in a Multi-device Environment

The RJ0FP frame pulse is used to synchronize a set of devices that are inter-connected via LVDS links. It is provided concurrently to all the devices in the system once every 125 μs, or multiples thereof. Characters retrieved from the receive LVDS links are written into a FIFO buffer 110. When the J0 character is received, it is written into a fixed location in the FIFO buffer 110. Subsequent characters are written into the locations following the foregoing fixed location. At each device in the system, a software configurable counter is used to mark the point, relative to RJ0FP, where all its receive LVDS links are expected to have delivered their J0 character. As directed by the delay counter, the device will then read the fixed location where the J0 character is stored, thus synchronizing all the receive LVDS links. Differential delays between and clock instabilities of LVDS links are absorbed by the FIFOs.

This foregoing embodiment provides a new use of 8B/10B control characters to label SONET/SDH transport frame, high-order path frame, and low-order path frame boundaries. The types of bytes that are encoded in 8B/10B control characters are configurable to suit different classes of SONET/SDH equipment (multiplex section terminators, high-order path terminators and low-order path terminators).

Furthermore, the use of 8B/10B encoding on de-scrambled SONET/SDH data streams in order ensures data transitions on the serial links and preserves DC balance.

The standard 8B/10B control character set is extended by treating the positive and negative running disparity codes of those control characters with an even number of ones and zeros as two separate control characters. This implementation doubles the number of control characters available for encoding of events. Further, DC balance is retained without having to alternately send positive and negative running disparity codes.

The use of FIFOs and a universal frame pulse with software programmable delay advantageously allow the transfer of a single SONET OC-N/SDH STM-M signal over multiple links.

This embodiment also provides a transparent in-band error reporting facility where errors detected at the SONET/SDH receiver can be transferred to the transmitter to construct remote error and defect indication codes.

The occurrence of line code violations of 8B/10B characters can be used to monitor error performance of the serial links.

This embodiment further provides for PRBS pattern insertion and monitoring thereby allowing datapath verification prior to injection of the actual payload.

Alternative Embodiments

An alternate embodiment utilizes out-of-band signaling to mark frame boundaries, status information and alarm events. SONET/SDH data bytes are carried in byte serial format on a set of four 8-bit buses (ID[4:1][7:0] and OD[4:1][7:0]). Transport frame boundaries and payload frame boundaries are marked by the IJ0J1[4:1] and OJ0J1[4:1] signals. SONET/SDH transport overhead bytes are distinguished from high-order path payload bytes by the IPL[4:1] and OPL[4:1] signals. Low order path payload boundaries are indicated by the ITV5[4:1] and OTV5[4:1] signals. Low-order path transport overhead bytes are distinguished from low-order path payload bytes by the ITPL[4:1] and OTPL[4:1] signals. Status and alarms are carried by the signals IPAIS[4:1], OPAIS[4:1], ITAIS[4:1] and OTAIS[4:1].

The above-described embodiments should be regarded as illustrative rather than restrictive, and it should be appreciated that variations may be made other than those discussed, by workers of ordinary skill in the art without departing from the scope of the present invention.

We claim:

1. A method of connecting SONET/SDH termination devices with payload processing devices, comprising:

(a) providing a transmit interface operative to receive incoming SONET/SDH signal streams and convert said SONET/SDH signal streams into outgoing low voltage differential signal (LVDS) levels with said SONET/SDH signal streams mapped into 8B/10B control characters so as to label SONET/SDH frame boundaries; and (b) providing a receive interface operative to receive incoming LVDS signal levels and convert said LVDS signal levels into outgoing SONET/SDH signal streams with decoding of said 8B/10B control characters labeling SONET/SDH frame boundaries into SONET/SDH control signals.

2. A method according to claim 1, wherein said SONET/SDH frame boundaries include transport frame, high-order path frame and low-order path frame boundaries.

3. A method according to claim 1, including mapping a descrambled SONET/SDH data stream into 8B/10B control characters to ensure data transitions on serial links and to preserve DC balance.

4. A method according to claim 1, including treating positive and negative disparity codes of said 8B/10B control characters having an even number of ones and zeros as separate control characters.

5. A method according to claim 1, including storing single bytes for N distinct streams within a SONET/ OC-N/SDH stream in a buffer and transferring said single bytes signals using a universal frame pulse with a software programmable delay to allow transfer of one or more SONET/SDH signals over multiple links.

6. A method according to claim 1, including providing transparent in-band error reporting where errors detected at a SONET/SDH receiver can be transferred to a transmitter to construct remote error and defect indication codes.

7. A method according to claim 1, including inserting a pseudo-random bit sequence pattern in serial transmit links to allow data path verification prior to injection of actual payload.

8. A method according to claim 1, including monitoring pseudo-random bit sequence patterns including said inserted pseudo-random bit sequence pattern.

9. A method according to claim 1, including overwriting a first unused SONET/SDH byte to form a pattern which allows in-service monitoring of link functionality as well as monitoring of downstream cross-connect mis-configurations.

10. A method according to claim 9, wherein a second unused SONET/SDH overhead byte is overwritten with a complement of a value in said first unused byte.

11. A method according to claim 9, wherein a second unused SONET/SDH overhead byte is overwritten with a complement of a value in said first unused byte.

12. A method according to claim 1, including overwriting a first unused SONET/SDH byte to form a pattern which allows in-service monitoring of link functionality as well as monitoring of downstream cross-connect mis-configurations.

13. A bus interface device for connecting SONET/SDH termination devices with payload processing devices, comprising:

(a) a transmit interface operative to receive incoming SONET/SDH signal streams and convert said SONET/SDH signal streams into outgoing low voltage differential signal (LVDS) levels with said SONET/SDH signal streams mapped into 8B/10B control characters so as to label SONET/SDH frame boundaries; and (b) a receive interface operative to receive incoming LVDS signal levels and convert said LVDS signal levels into outgoing SONET/SDH signal streams with decoding of said 8B/10B control characters labeling SONET/SDH frame boundaries into SONET/SDH control signals.

14. A bus interface device according to claim 13, wherein said SONET/SDH frame boundaries include transport frame, high-order path frame and low-order path frame boundaries.

15. A bus interface device according to claim 13, including a plurality of 8B/10B encoder blocks operative to map a descrambled SONET/SDH data stream into 8B/10B control characters to ensure data transitions on serial links and to preserve DC balance.

16. A bus interface device according to claim 13, including a buffer for storing signals, wherein said signals are transferred using a universal frame pulse with a software programmable delay in order to allow transfer of one or more SONET/SDH signals over multiple links.

17. A bus interface device according to claim 13, including a pseudo-random bit sequence pattern in serial transmit links to allow data path verification prior to injection of actual payload.

18. A bus interface device according to claim 13, including a character alignment block and a frame alignment block operative to detect line code violations of 8B/10B characters in order to monitor error performance of serial links.

19. A bus interface device according to claim 13, including a pseudo-random bit sequence generator detector operative to monitor and overwrite E1 and B1 bytes to form a pattern which allows in-service monitoring of link functionality as well as monitoring of downstream cross-connect mis-configurations in serial transmit links operative to allow data path verification prior to injection of actual payload.

20. A bus interface device according to claim 19, wherein bytes in E1 are overwritten with a complement of a value in B1 bytes.

* * * * *

UNITED STATES PATENT AND TRADEMARK OFFICE
CERTIFICATE OF CORRECTION

PATENT NO.        : 6,820,159 B2
APPLICATION NO. : 09/8477660
DATED             : November 16, 2004
INVENTOR(S)       : Mok et al.

Page 1 of 1

It is certified that error appears in the above-identified patent and that said Letters Patent is hereby corrected as shown below:

Column 6, line 51, delete "[4:11]" and insert -- 4:1]--.

Column 9, line 3, delete "at".

Signed and Sealed this

Fifteenth Day of August, 2006

JON W. DUDAS
*Director of the United States Patent and Trademark Office*

UNITED STATES PATENT AND TRADEMARK OFFICE
CERTIFICATE OF CORRECTION

PATENT NO. : 6,820,159 B2  Page 1 of 1
APPLICATION NO. : 09/847660
DATED : November 16, 2004
INVENTOR(S) : Mok, et al.

It is certified that error appears in the above-identified patent and that said Letters Patent is hereby corrected as shown below:

Column 6, line 51, delete "[4:11]" and insert -- [4:1] --.

Column 9, line 3, delete "at".

Signed and Sealed this

Twenty-ninth Day of August, 2006

JON W. DUDAS
*Director of the United States Patent and Trademark Office*